United States Patent [19]

Vandegrift et al.

[11] Patent Number: 4,851,124

[45] **Date of Patent: * Jul. 25, 1989**

[54] METHOD OF REMOVING AND DETOXIFYING A PHOSPHORUS-BASED SUBSTANCE

[75] Inventors: George F. Vandegrift, Bolingbrook; Martin J. Steindler, Park Forest, both of Ill.

[73] Assignee: The United States of America as represented by the United States Department of Energy, Washington, D.C.

[ * ] Notice: The portion of the term of this patent subsequent to Jun. 25, 2004 has been disclaimed.

[21] Appl. No.: 736,576

[22] Filed: May 21, 1985

[51] Int. Cl.$^4$ ........................ B01D 13/00; B01D 11/04

[52] U.S. Cl. .................................... 210/638; 210/643; 210/644; 210/906

[58] Field of Search ............... 210/638, 906, 643, 644, 210/634

[56] References Cited

U.S. PATENT DOCUMENTS

| | | | |
|---|---|---|---|
| 3,617,546 | 11/1971 | Li et al. | 210/643 |
| 3,637,488 | 1/1972 | Li et al. | 210/643 |
| 3,956,112 | 5/1976 | Lee et al. | 210/644 |
| 4,064,040 | 12/1977 | Singhal et al. | 210/643 |
| 4,244,816 | 1/1981 | Volger et al. | 210/643 |
| 4,292,181 | 9/1981 | Li et al. | 210/643 |

*Primary Examiner*—Benoit Castel
*Attorney, Agent, or Firm*—James W. Weinberger; Arthur A. Churm; Judson R. Hightower

[57] ABSTRACT

A method of removing organic phosphorus-based poisonous substances from water contaminated therewith and of subsequently destroying the toxicity of the substance is disclosed. Initially, a water-immiscible organic is immobilized on a supported liquid membrane. Thereafter, the contaminated water is contacted with one side of the supported liquid membrane to selectively dissolve the phosphorus-based substance in the organic extractant. At the same time, the other side of the supported liquid membrane is contacted with a hydroxy-affording strong base to react the phosphorus-based substance dissolved by the organic extractant with a hydroxy ion. This forms a non-toxic reaction product in the base. The organic extractant can be a water-insoluble trialkyl amine, such as trilauryl amine. The phosphorus-based substance can be phosphoryl or a thiophosphoryl.

8 Claims, No Drawings

METHOD OF REMOVING AND DETOXIFYING A PHOSPHORUS-BASED SUBSTANCE

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates generally to the purification of water, and more particularly to the removal of a phosphorus-based substance from water and the destroying of the toxicity of the phosphorus-based substance after removal.

A major pollution problem associated with aqueous streams is the presence of poisonous phosphorus-based insecticides. In addition, there is a potential for pollution of aqueous streams with phosphorus-based nerve agents. Therefore, methods to remove phosphorus-based substances from aqueous streams are desirable.

In U.S. Pat. Nos. 3,617,546 (Li et al) and 3,637,488 (Li et al), a method of removing compounds from waste liquid streams such as water is disclosed. In particular, compounds such as phenols or phosphates are removed using aqueous or organic liquid membranes which can contain surfactants or hydroxide compounds.

In U.S. Pat. No. 4,064,040 (Singhal et al), a process for removing ammonium sulfide from waste water by contacting the waste water with a liquid membrane emulsion is disclosed. The use of a liquid membrane capsule system having a polyamine surfactant coating is also disclosed in U.S. Pat. No. 4,244,816 (Vogler et al). These membranes are used in medical treatment processes such as renal dialysis.

SUMMARY OF THE INVENTION

In accordance with the present invention, a method of removing a phosphorus-based poisonous substance from water contaminated therewith is provided. In addition, the toxicity of the phosphorus-based substance is also subsequently destroyed. According to the method, a water-immiscible organic solvent is first immobilized on a supported liquid membrane. Thereafter, the contaminated water is contacted with one side of the supported liquid membrane to absorb the phosphorus-based substance in the organic solvent. The other side of the supported liquid membrane is contacted with a hydroxy-affording strong base to react the phosphorus-based solvated species with a hydroxy ion to form a non-toxic reaction product in the base.

In the preferred embodiment, the solvent is an extractant which is selective for phosphorus-based compounds and which is preferably dissolved with a suitable diluent. If desired, a nucelophile is also added to the strong base to increase the hydrolysis rate.

The present invention is particularly adapted to the removal of phosphoryl and thiophosphoryl contaminants.

It is a feature of the present invention that the seperatable species are concentrated in the waste solution by many orders of magnitude above the original feed concentration. In addition, the volume of the recirculating strip or waste solution can be many orders of magnitude smaller than the feed solution.

It is also an advantage of the present invention that the equipment needed for the separation is simple, light, and compact. In addition, the equipment can be run with manual effort so that no source of power or heat is required.

It is a further advantage of the present invention that the equipment can be modularized so that fitting the equipment to the size of the feed stream is a simple procedure.

It is a yet another advantage of the present invention that over a wide range of conditions, particulate or dissolved species will not hinder the process. This makes the process applicable to the cleanup of many natural waters and spent decontamination solutions.

It is still another advantage of the present invention that the products formed in the strip or waste solution are likely to be nontoxic. Therefore, the strip or waste solution may be easily disposed of with conventional methods.

Still another advantage of the present invention is that, within practical limits, any level of decontamination that is necessary for safety is achievable.

Yet another advantage of the present invention is that the chemicals used in the strip solution are stable and can be carried dry and diluted with contaminated water when needed. In addition, no chemicals are transferred into the purified water during treatment.

It should also be appreciated that because physical separation of the phases is not necessary, volume ratios of the aqueous feed and strip phases to that of the organic solvent can be very large. This leads to high efficiency and to low inventory requirements of the organic solvent. In addition, very high decontamination factors are achievable in a single stage, and, because the units can be modularized, that phase can be sized to reach the specified decontamination.

Other features and advantages of the present invention are stated in or apparent from a detailed description of a presently preferred embodiment of the invention found herein below.

DETAILED DESCRIPTION OF THE PREFERRED EMBODIMENT

Before discussing the present invention in detail, it should be appreciated that the present invention is based on supported liquid membrane separation. Supported liquid membrane technology is a hybrid of conventional membrane and solvent extraction technologies that combines the simplicity of equipment and operations of membrane technology and the selectivity of separations obtainable by liquid-liquid extraction reagents. There are two constitutents of a supported liquid membrane, the support and the liquid. The support is a conventional, hydrophobic membrane in the form of, for example, a thin plate (20–100 μm thick) or a hollow fiber, having pore sizes in the range of 1,000–5,000 A. The hydrophobicity of the support is essential to holding the organic solvent in the pores by a combination of capillary action and aqueous phase/organic phase/solid support interfacial tensions. Support materials must possess both chemical and physical stability. Membrane materials and modules prepared for use in ultra- and microfiltration are applicable as supported liquid membrane supports. Each of these modules contain upwards of thousands of hollow fibers.

The organic liquid that occupies the pores of the support is a water-immiscible organic solvent in which the phosphorus-based toxic substances are soluble. Preferably the solvent includes an appropriate diluent. The diluent acts to lower the organic phase viscosity, and hence, increases the diffusivity of the solvated species in the membrane and to lower the loss of the extractant by aqueous phase solubility. There are basically three types of extraction mechanisms (or coupled transports) that bring materials into the organic phase: (1) complexation, (2) solvation (which is particularly adapted for transport of phosphorus-based toxic substances), and (3) ion exchange. Examples of each type of these reactions are shown below:

(1) Complexation of $Co^{2+}$ by bis(2-ethylhexyl) phosphoric acid—HDEHP $$Co_{aq}^{2+}+6HDEHP_{org}\rightleftharpoons Co(HDEHP)_2.4HDEHP_{org}+2H_{aq}^{+}$$

(2) Solvation of $UO_2(NO_3)_2$ by tributyl phosphate—TBP $$UO_2^{2+}+2NO_{3aq}^{-}+2TBP_{org}\rightleftharpoons UO_2(NO_3)_2.2TBP_{org}$$

(3) Ion exchange of $Cr_2O_7^{2-}$ for chloride ion in trilaurylmethylammonium chloride—[TLMA]Cl $$Cr_2O_7^{2-}+2[TLMA]Cl_{org}\rightleftharpoons [TLMA]_2[Cr_2O_7]_{org}+2Cl_{aq}^{-}$$

Control of these reactions, or the shift of equilibrium, is generally effected by variation in pH or ion concentrations.

The ability to control the distribution of a species between the organic and aquoeus phases by changing the aqueous phase concentration of another species makes liquid/liquid extraction a powerful tool for separations and purifications. It is also the basis for coupled mass transport in a liquid membrane. A species can be moved from a solution where it is at low concentration to one of high concentration by coupling its flux to that of another species.

The ability of a supported liquid membrane to move species against a concentration gradient is a very important advantage over conventional membrane technology. This characteristic of a supported liquid membrane permits separation of a species from a complex solution of many species and the simultaneous concentration of the species. The high specificity of a supported liquid membrane compared to conventional membranes makes it extremely attractive as separation factors of many orders of magnitude are easily obtainable in a single stage. Another advantage is the high fluxes achievable with a supported liquid membrane compared to conventional membranes. This is the result of diffusivities in liquids being orders of magnitude higher than in polymeric membranes.

It should be appreciated that the present invention is based on the fact that many insecticides used in agriculture have similar chemical structures and reactivities to those of nerve agents. Exemplary insecticides are PARATHION and Diazinon ®. The present invention therefore finds utility with both phosphoryl compounds and thiophosphoryl compounds.

There are two chemical reactions important for the use of a supported light membrane modular unit to purify water contaminated by chemicals such as nerve agents or insecticides:

(1) The strong interaction (adduct formation) between many solvents and substituted neutral phosphate-, phosphonate-, and phosphinate-esters, and (2) The tendency of these phosphorus compounds to hydrolyze in the presence of strong nucleophiles, such as hydroxide, oximes, hydroxamic acids, hydrogen peroxide, and hypochlorite.

The first reaction in the process of the present invention using trialkyl amine as an example is that used to drive the nerve agents or insecticides to partition into the membrane. This process is as follows:

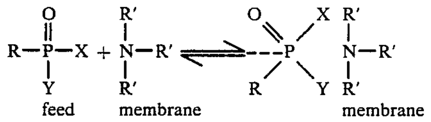

X and Y, for example, can be F, CN, OR, SR, Cl, $NO_2$ or $S(CH_2)_nNR_2$; R and R' are alkyl and/or aryl hydrocarbon groups.

The second reaction is the means of stripping, concentrating, and detoxifying these agents. This reaction is as follows:

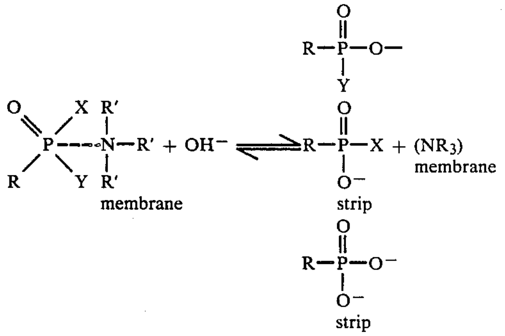

It is expected that the anionic species found in this reaction will neither be toxic nor volatile. In addition, it is expected that there will not be any chemical driving force to partition these anionic species to the membrane and, therefore, back into the feed.

The overall reaction for the nerve agents or insecticides is as follows:

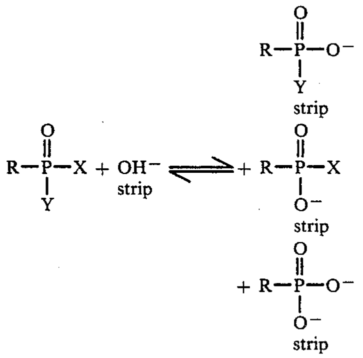

In view of the above, it should be appreciated that the process proceeds as follows. Initially, the feed solution containing the phosphorus-based substance in aqueous solution or suspension is introduced along one side of a supported liquid membrane located in a suitable module. The supported liquid membrane includes an appropriate water-immiscible organic solvent which may include a viscosity-reducing diluent as discussed above. Thus, the solvent reacts with the phosphorus-based substance to form a solvated species. Located on the other side of the supported liquid membrane is a solution having a high OH- concentration such as NaOH or KOH. Consequently, the solvated species diffuses across the supported liquid membrane toward the strong basic solution. Thereafter, a hydroxy ion, and/or perhaps another powerful nucleophile, reacts with the neutral phosphorus-based substance to form an anionic species. Thereafter, the carrier returns across the membrane to repeat the cycle. It should be appreciated that the anionic species does not diffuse back across the membrane because of the low solubility in the organic phase.

As the feed solution is passed through the supported liquid membrane module, the contaminant (phosphorus) level is depleted. To reach an acceptable level, the module can be sized for once through decontamination or in a recycle mode.

The organic phase in the membrane is a solvent which is water-immiscible, in which the distribution ratio of toxin between the water phase and the solvent is greater than two, preferably greater than 10, and in which the distribution ratio between the stable solvated species in the solvent and the strip is less than 0.5, preferably less than 0.1.

The solvent preferably contains a viscosity-reducing diluent to increase diffusibility of the solvated species across the membrane. Suitable extractants may be trialkyl amines, alcohols, ketones, aldelydes, ethers or bifunctional amines. Suitable diluents may be water-immiscible aliphatic or aromatic hydrocarbons. It will be appreciated that diluents which meet the solubility and distribution ratio requirements and thus act as appropriate solvents, may be used alone.

Preferably, the strip solution is a concentrated sodium or potassium hydroxide solution. The solution may contain other anionic or neutral species to accelerate the hydrolysis reaction. It is expected that in most instances, the trilauryl amine or other adduct forming solvents in the membrane will act as catalysts to the hydrolysis of the species at the organic membrane/strip solution interface. This expectation is based on known observations of amine catalysis of nucleophilic attack on phosphorus compounds and on the possible enhancement of hydrolysis at the interface. In the interfacial region, the nerve agent or insecticide can be pictured in a constrained position with the organic (nonpolar) end pulled back into the organic membrane away from the hydrophylic phosphoryl group, thus leaving it open to nucleophilic attack and to subsequent hydrolysis.

If hydrolysis rates are too low with carrier catalysis and hydroxide alone, nucleophiles can be included in the strip solution to increase this rate. For example, although GB (sarin) has an essentially zero hydrolysis rate in water at 25° C. and ph 7, the half time of the hydrolysis reaction is less than a second in 0.1M C10— and less than a microsecond in 0.1M HOOH. Some compounds, for example, oximes, are destroyed by their acceleration of the hydrolysis of neutral phosphorus compounds. The reaction responsible for the acceleration of GB hydrolysis by an oxime is as follows:

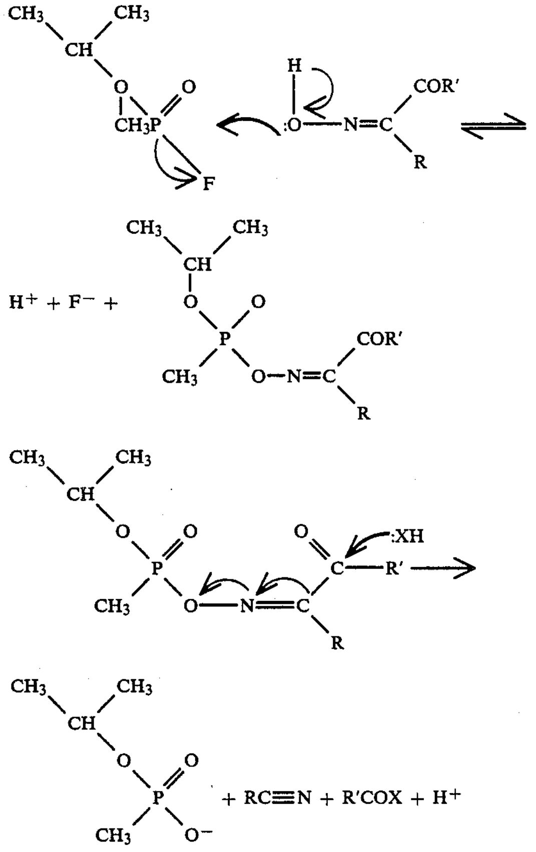

In the above reaction, X is an amine or oxygen base. Other species that have been observed to catalyze or accelerate the hydrolysis of a phosphorus (V) compound are hydroxylamine, nitrite, hydroxamic acids, and dimethylformamide.

The spent strip or waste solution contains hydrolyzed phosphate, phosphonate and/or phosphinate ions in a strong caustic. Disposition of the waste will then follow decisions regarding the most appropriate process (dilution, solidification, or lagoon). The purified feed solution could then be used with or without additional treatment steps. Possible additional treatment steps include analysis to determine whether all of the contaminants have been removed or treatment with a disinfectant. This would depend on the particular requirements of the contaminant and the use of the purified feed.

In view of existing supported liquid membranes, it is expected that units to purify water according to the present invention would be small, easily moved, and relatively simple. If desired, of course, large units that produce considerable pure water are also possible. For example, a module which is currently typical of that being used for micro- and ultrafiltration will be considered to exemplify the physical dimensions and throughputs of a system according to the present invention. Such a module is typically 36 inches long and 4.5 inches high with approximately a 30 inch long bundle of fibers therein. The fibers typically number approximately 5,000 and have a diameter of 0.762 mm and a wall thickness of 0.064 mm. With such a module, the total surface area would be 7.6 $m^2$.

The degree of contamination that is accomplished by a hollow fiber, supported liquid membrane module such as that described above is estimated by the following equation:

$$C_{out}=C_{in}\,e^{-AP/Q}$$

where:

$C_{out}$ is the concentration of the membrane-permeable species at the outlet of the module;

$C_{in}$ is its initial feed concentration;

Q is the volumetric flow rate of the feed solution through the module in units of $cm^3/sec$;

P is the permeability of the species through the membrane in units of cm/sec; (the permeability of the species can be measured experimentally or calculated based on a model that uses the chemical compositions and fluid dynamics of a system); and A is the area of contact between the feed solution and the organic membrane in the module in units of $cm^2$, and is defined as follows:

$$A=NX(2\pi rL)$$

where: r and L are the inner radius and length of the fiber; ($2\pi rL$) is the geometric surface area of one fiber lumen; N is the total number of fibers in the module; and X is the fraction of the fiber wall that contains pores loaded with the organic-carrier phase.

It should be appreciated that by connecting various modules together, the degree of decontamination and/or the throughput can be increased. Modules can be connected either in parallel or series as appropriate. Coupling modules in series is equivalent to increasing the fiber length (L) while a parallel coupling is equivalent to increasing the number of fibers (N). Both connection methods have the equivalent effort of increasing the membrane/feed contact area. The use of either or both of these coupling methods in a module system is determined by optimization of the feed fluid dynamics and the pressure drop of the system.

The following table indicates the volumetric flow rate per module necessary to decontaminate a feed by 2 to 5 orders of magnitude in a module such as that discussed above for an easily obtainable permeability of $3\times10^{-3}$cm/sec.

| Decontamination[a] Factor | Flow Rate Per Module[b] mL/sec[c] | Pressure drop in a parallel configuration,[d,e] $10^2$Pa[f] |
|---|---|---|
| $10^{-5}$ | 7.9 | 3.03 |
| $10^{-4}$ | 9.9 | 3.79 |
| $10^{-3}$ | 13.1 | 5.02 |
| $10^{-2}$ | 19.7 | 7.55 |

[a]That is, $C_{out}/C_{in}$.
[b]That is, for a flow rate per module of 10 mL/sec, one module could procude 10 mL of decontamination feed in one second and a 100 module system could produce 1000 mL/sec.
[c]Equivalent to 0.951 gal/h.
[d]For laminar flow through a pipe the pressure drop is calculated by the formula $\Delta p = 128\,\mu \cdot Q' \cdot L/\pi\, d^4$, where $\mu$ is the dynamic viscosity of the fluid ($1 \times 10^{-3}$ pascal sec for $H_2O$ at 20° C.); d is the inner diameter of the pipe; Q' is the flow rate through a single fiber lumen (for the reference module, Q' = Q/5000; and L is the length of the fiber.
[e]For a parallel configuration the pressure drop is the same, at a constant flow rate per module, for one or for many modules. In the case of a series configuration, however, the pressure drop for Z modules is equal to the pressure drop for one module multiplied by Z (again, because the pressure drop is proportional to the length of the fiber).
[f]A pascal = $1.45 \times 10^{-4}$ psi.

For a reduction of the contaminant concentration by $10^4$, it is estimated that one man operating a 3 module unit for one hour could decontaminate over 28 gallons of water. A system of 100 modules could decontaminate 22,600 gallons of water per day.

The low pressure drop across the modules indicates that most of the work running the module system is in moving water to and from the module system rather than in passing the feed through the fiber lumen. For example, the power expended to pass 28 gallons of contaminated water through a 3 module unit would be $1.5\times10^{-5}$ horsepower for a parallel configuration (pressure drop=3.9 cm) and $4.4\times10^{-5}$ horsepower for a series configuration (pressure drop=11.6 cm). Power is calculated as follows:

$$P=\Delta HQpg;$$

where

P is in units of watts;

$\Delta H$ is the pressure drop in the moving fluids;

Q is the volumeric flow rate through the system in units of $m^3/sec$;

p is the density of the fluid in $kg/m^3$; and g is the acceleration of gravity (9.8 $m/sec^2$).

Designing pumps, either manually operated or by other sources of energy, to run under these conditions would be easily achievable by one of ordinary skill in the art. However, as is evident from the data and the table, controlling the linear flow velocity of the feed through the module is critical and must therefore be carefully controlled to achieve the desired purification.

It should be appreciated that before the present invention is applied to a specific insecticide or nerve agent, the distribution ratios of the nerve agent or insecticide in water and in the organic phase should be determined. In addition, the hydrolysis rates of nerve agents or insecticides in an $OH^-$ solution alone, in the presence of a two phase system, and in a system catalyzed by aqueous soluble species ($HOO^-$,$CLO^-$) should further be determined. Determination of fluxes of the nerve agent or insecticide through the membrane and the stability of these fluxes related to the agent concentration, the carrier concentration, the strip composition, the temperature, and the fluid dynamics is further necessary. Another important feature to consider is the identity of the form of hydrolysis species in the strip or waste solution as a function of time. The extent of membrane transfer of neutral species (such as alcohols and thiols) from the strip or waste solution into the purified feed stream should also be considered.

Although the present invention has been described with respect to an exemplary embodiment thereof, it will be understood by those with ordinary skill in the art that variations and modification can be effected within the scope and spirit of the invention.

The embodiments of this invention in which an exclusive property or privilege is claimed are defined as follows:

1. A method of removing organic phosphorus-based poisonous substances selected from the group consisting of phosphoryl and thiophosphoryl from water contaminated therewith and of subsequently destroying the toxicity of the substances comprising the steps of:

immobilizing a water immiscible organic solvent on a porous hydrophobic membrane to form a supported liquid membrane, the solvent being one which will react with the phosphorous-based substance to form a solvated species and being selected from the group consisting of trialkyl amines, alcohols, ketones, aldehydes, ethers and bifunctional amines;

contacting the contaminated water with one side of the supported liquid membrane to dissolve the phosphorous-based substance in the organic solvent forming a solvated organic species, the distribution ratio of the poisonous substance between the water and the organic solvent being greater than two; and contacting the other side of the supported liquid membrane with a solution containing a hydroxy-affording strong base to react with dissolved phosphorous-based substance in the organic solvent to form a nontoxic reaction product in the base, the distribution ratio of the solvated organic species in the solvent and the strong base being 0.5 or less.

2. The method of claim 1 wherein the solvent is trilauryl amine.

3. The method of claim 2 wherein the solvent includes a suitable organic diluent.

4. The method of claim 4 wherein the organic diluent is selected from the group consisting of water-immiscible, aliphatic and aromatic hydrocarbons.

5. The method of claim 4 wherein the phosphorous-based substance is a phosphoryl.

6. The method of claim 4 further including the adding of a nucleophile to the strong base to increase the hydrolysis rate.

7. The method of claim 6 wherein the nucleophile is selected from the group consisting of hydroxides, oximes, hydroxamic acids, hydrogen peroxide, and hypochloride.

8. A method of removing and detoxifying a phosphorus-based substance as claimed in claim 2 wherein the phosphorus-based substance is a thiophosphoryl.

* * * * *